Feb. 18, 1930.  F. B. COONEY  1,747,889
BOTTLE CLOSURE
Filed April 28, 1928
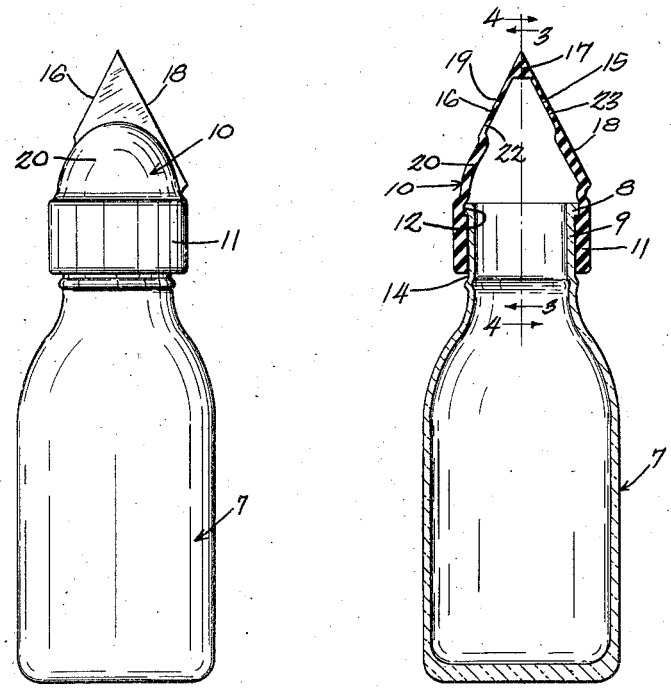
Fig.1  Fig.2
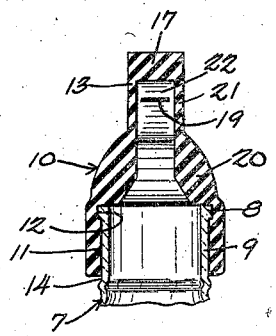 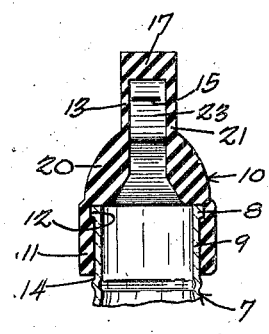
Fig.3  Fig.4
Frank B. Cooney
Inventor
by Smith and Freeman
Attorneys Patented Feb. 18, 1930.

1,747,889

UNITED STATES PATENT OFFICE

FRANK B. COONEY, OF SANDUSKY, OHIO, ASSIGNOR TO THE AMERICAN CRAYON COMPANY, OF SANDUSKY, OHIO, A CORPORATION OF OHIO

BOTTLE CLOSURE

Application filed April 28, 1928. Serial No. 273,608.

My invention relates to stoppers, nozzles, and the like, and in particular refers to an improved spreader cap, to be applied to containers of glue or other suitable fluids, and the principal object of my invention is to provide a new and improved cap particularly adapted for this purpose. In the drawings accompanying this specification and forming a part of this application I have shown, for purposes of illustration, one form which my invention may assume, and in these drawings:

Figure 1 is an elevation showing a spreader cap attached to a bottle,

Figure 2 is a view similar to Figure 1 showing the cap and the bottle in section, Figure 3 is a section taken on the line 3—3 of Figure 2, Figure 4 is a section taken on the line 4—4 of Figure 2.

I show my invention as applied to a bottle 7 provided at the top of its neck 9 with an outwardly extending flange 8 extending entirely around the neck 9 of the bottle 7. A spreader cap 10, preferably made of rubber, is held in a fixed position on the neck 9 of the bottle 7 by means of a collar 11 resiliently clasping the outer periphery 14 of the neck 9 beneath the flange 8, a depression 12 in the collar 11 engaging the flange 8 of the neck 9 thereby providing a tight joint which prevents the liquid contained in the bottle 7 from leaking out or evaporating.

The spreader surfaces of the spreader cap 10 comprise two upper outside flat surfaces 16 and 18 of two narrow faces 22 and 23 converging in substantially a V-shaped formation and forming a solid tip 17. The spreader surface 16 is relatively shorter than the spreader surface 18 for use in applying glue in smaller quantities, the short spreader surface 16 is provided at a point substantially midway between its top and bottom ends with a horizontal slit 19, and the long spreader surface 18 is provided at a point relatively near its top end with a horizontal slit 15, the purpose of these slits 15 and 19 being to permit the glue or other liquid contained in the bottle 7 to flow out onto the spreader surfaces 16 and 18, these slits 15 and 19 being opened by pressing on the tip 17. Extending downward from the outside edges of the spreader surfaces 16 and 18 are the side walls 13 and 21 curved outwardly at their lower extremities forming the shoulders 20 terminating at their lower end in the collar 11 and substantially thicker than the side walls 13 and 21 serving thus to re-enforce and to strengthen the side walls 13 and 21.

From the above description it will be apparent to those skilled in the art that I have provided a new and improved glue spreader with two spreader surfaces of unequal length one suitable for spreading a small amount of glue and the other suitable for spreading a large amount of glue. Also that the fluid is kept in an air tight condition in the container and that the flow of the glue from the container is easily controlled by varying the pressure on the tip. At the same time it also will be apparent to those skilled in the art that the particular embodiment of my invention herein shown and described may be variously changed and modified without departing from the spirit of my invention or sacrificing the advantages thereof, and it therefore will be understood that the disclosure herein is illustrative only, and that my invention is not limited thereto.

I claim:—

1. A closure for a fluid container comprising: a cap having two walls joined by two converging spreader faces of unequal length disposed substantially in the position of an inverted V over the neck of the fluid container and each provided with means for permitting the liquid in the container to flow therethrough.

2. A closure for a fluid container comprising: a cap having two parallel vertical walls joined at their top by two converging spreader faces disposed substantially in the position of an inverted V over the neck of the fluid container and provided with means for permitting the liquid in the container to flow through said faces, the lower part of the outside surface of each wall being curved out providing shoulders of relatively great thickness which serve as reinforcements and supports for the side walls.

3. A closure for a fluid container comprising: a cap having two parallel vertical walls joined by two converging spreader faces of unequal length disposed substantially in the position of an inverted V over the neck of the fluid container and provided with means for permitting the liquid in the container to flow through said faces, the lower part of the outside surface of each wall being curved out providing shoulders of relatively great thickness which serve as reinforcements and supports for the side walls.

4. A closure for a fluid container comprising: a cap having two walls joined by two converging spreader faces of unequal length disposed substantially in the position of an inverted V over the neck of the fluid container and each provided with a horizontal slit through which the fluid from the container may flow.

5. A closure for a fluid container comprising: a cap having two parallel vertical walls joined at their top by two converging spreader faces disposed substantially in the position of an inverted V over the neck of the fluid container and provided with horizontal slits through which the fluid from the container may flow, the lower part of the outside surface of each wall being curved out providing shoulders of relatively great thickness which serve as reinforcements and supports for the side walls.

6. A closure for a fluid container comprising: a cap having two parallel vertical walls joined by two converging spreader faces of unequal length disposed substantially in the position of an inverted V over the neck of the fluid container and provided with horizontal slits through which the fluid from the container may flow, the lower part of the outside surface of each wall being curved out providing shoulders of relatively great thickness which serve as reinforcements and supports for the side walls.

7. A closure for a fluid container comprising: a cap having two walls joined by two converging spreader faces of unequal length disposed substantially in the position of an inverted V over the neck of the fluid container and joined for a short distance below their intersection point forming a flexible tip operating by pressure applied to its sides to open in either of said faces a horizontal slit through which the fluid from the container may flow.

8. A closure for a fluid container comprising: a cap having two parallel vertical walls joined at their top by two converging spreader faces disposed substantially in the position of an inverted V over the neck of the fluid container and provided with horizontal slits through which the fluid from the container may flow, the lower part of the outside surface of each wall being curved out providing shoulders of relatively great thickness which serve as reinforcements and supports for the side walls, said converging faces being joined for a short distance below their intersection point forming a flexible tip operating by pressure applied to its sides to open one or the other of said slits.

9. A closure for a fluid container comprising: a cap having two parallel vertical walls joined by two converging spreader faces of unequal length disposed substantially in the position of an inverted V over the neck of the fluid container and provided with horizontal slits through which the fluid from the container may flow and are joined for a short distance below their intersection point forming a flexible tip operated by pressure applied to its sides to open one or the other of said slits, the lower part of the outside surface of each wall being curved out providing shoulders of relatively great thickness which serve as reinforcements and supports for the side walls.

10. A dispensing closure for a fluid container comprising two spreader portions of different dimensions, one larger portion for covering greater areas, and one smaller portion for covering lesser areas, and two independent supply openings, one for each portion.

11. A dispensing closure for a fluid container comprising two spreader portions of different dimensions, one larger portion for covering greater areas, and one smaller portion for covering lesser areas, and two independent supply openings, one for each portion, said supply openings being positioned so that the distortion of the closure in use will tend to close the supply opening for the portion not in use and to open the supply opening for the portion in use.

In testimony whereof I hereunto affix my signature.

FRANK B. COONEY.